Patented Dec. 14, 1948

2,456,408

UNITED STATES PATENT OFFICE 2,456,408

SYNTHETIC DRYING COMPOSITIONS

Sylvan Owen Greenlee, Louisville, Ky., assignor to Devoe & Raynolds Company, Inc., Louisville, Ky., a corporation of New York No Drawing. Application September 14, 1943, Serial No. 502,317

16 Claims. (Cl. 260—410.5)

1

This invention relates to new synthetic drying compositions, and more particularly to new synthetic unsaturated esters possessing excellent drying characteristics, and to drying compositions such as varnishes, etc. containing such esters and adapted to form insoluble and infusible protective coatings under the influence of air oxidation and/or heat treatment.

The new drying compositions are synthetic unsaturated ester compositions made by esterifying polymeric polyhydric alcohols of controlled molecular weight and number of hydroxyl groups per molecule with fatty acids of drying, semi-drying, or even non-drying oils, with predetermination and regulation of the effective number of hydroxyl groups per molecule of the polymeric polyhydric alcohol with reference to the degree of unsaturation of the acids used for esterification.

The polymeric polyhydric alcohols used in producing the new drying esters are prepared by the reaction of polyhydric phenols with polyhaloalcohols, epihalohydrins or polyepoxy compounds, with regulation of the proportions and degree of polymerization to form polymeric polyhydric alcohols of predetermined molecular weights and predetermined hydroxyl contents.

The polymeric polyhydric alcohols which have been found particularly advantageous for use in making the new high molecular weight unsaturated esters are those produced by the reaction of bis-phenol (p,p'-dihydroxydiphenyl dimethyl methane) or other polyhydric phenols with polyhaloalcohols, epihalohydrins, and polyepoxy compounds to give polymeric polyhydric alcohols containing at least three hydroxyl groups and more advantageously a larger number of e. g. 5 to 15 or 20 or more, depending upon the unsaturation of the fatty acids used for esterification.

In preparing the polymeric polyhydric alcohols of predetermined molecular weight and predetermined hydroxyl content, a polyhydric phenol is caused to react with a polychloro alcohol or an epichlorohydrin in regulated proportions and advantageously with a monofunctional reactant such as phenol, glycerol monochlorhydrin or ethylene chlorhydrin, as hereinafter described and illustrated. The polymeric polyhydric alcohols may also be prepared from polyhydric phenols and polyepoxy compounds, as hereinafter described and illustrated.

2

The polyhydric phenols used in making the polymeric polyhydric alcohols may be mononuclear, such as resorcinol, hydroquinone, catechol, phloroglucinol, etc., or polynuclear, such as bis-phenol (p,p'-dihydroxydiphenyl dimethyl methane), p,p'-dihydroxybenzophenone, p,p'-dihydroxydiphenol, p,p'-dihydroxydibenzyl, o,p,o',p'-tetrahydroxydiphenyl dimethyl methane, hematoxylin, polyhydric anthracenes, polyhydric naphthalenes, etc. Bis-phenol is particularly advantageous for use in making the new ester compositions.

The polyfunctional alcohol-contributing reactant may be an epihalohydrin, such as epichlorhydrin, epibromhydrin, epihalohydrins of mannitol, sorbitol, erythritol, etc.; a polyhalohydrin such as glycerol dichlorhydrin, beta-methyl glycerol dichlorhydrin, mannitol or sorbitol dichlorhydrin, etc.; or a polyepoxide compound such as bis-(2,3-epoxypropyl) ether, butylene dioxide, diepoxides of mannitol, sorbitol, etc.

The monofunctional reactant used when the polyhydric phenol is less than equivalent proportions with reference to epihalohydrin or polyhalohydrin may be a monohydric phenol such as phenol, alkyl substituted phenols, etc.; and when the polyhydric phenol is used in more than equivalent proportions with reference to the epihalohydrin or polyhalohydrin may be ethylene chlorhydrin, glycerol monochlorhydrin, erythritol monochlorhydrin, mannitol or sorbitol monochlorhydrin, ethylene oxide, propylene oxide, dimethyl or diethyl sulfate, etc. When polyepoxides are used in less than equivalent proportions with polyhydric phenols, the monofunctional reactant is advantageously ethylene oxide, propylene oxide, glycidol, or other monoepoxy compound, etc.

The nature of the monofunctional reactant will depend upon whether the polyhydric phenol is used in less than equivalent proportions or more than equivalent proportions with reference to the polyfunctional alcohol-contributing reactant, e. g. a monohydric phenol or a mixture of monohydric phenols, such as phenol and tertiary butyl phenol being used when the polyhydric phenol is in less than equivalent proportions; and end components such as ethylene chlorhydrin, glycerol monochlorhydrin, dimethyl sulfate, ethylene oxide or other monoepoxy compound being used when the polyhydric phenol is in greater than equivalent proportions with reference to the polyfunctional alcohol-contributing reactant.

The polymeric polyhydric alcohols used in making the new esters, when a monofunctional reactant is used, may be considered as having the following general formulas or structures, depending upon whether the dihydric phenol is in excess or the polyfunctional alcohol-contributing reactant is in excess.

1. Dihydric phenol used in excess

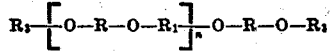

2. Difunctional alcohol-contributing reactant used in excess

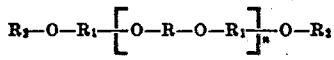

in which R is the residue of a dihydric phenol; $R_1$ is the residue of a difunctional alcohol-contributing reactant; $R_2$ is the residue of a monofunctional reactant such as a monohydric phenol; and $R_3$ is the residue of a monofunctional reactant such as ethylene chlorhydrin or glycerol monochlorhydrin, or other monohalide, or of ethylene oxide or other monoepoxy compound, etc.; and in which $n$ represents the extent of the polymerization.

It will be seen that both of the above formulas contain the common polymeric structure

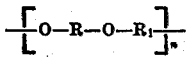

When the polymeric polyhydric alcohols are made from polyhydric phenols and polyepoxide compounds in equivalent proportions and without the use of a monofunctional reactant, the products will have the same general structural formula, when dihydric phenols are used. When a monofunctional reactant is used, with other than equivalent proportions of the dihydric phenol and of the polyfunctional alcohol-contributing reactant, it will be seen from the above formulas that the formula is modified by having one end component at one end of the polymeric chain indicated by the brackets, and with the other end of the polymeric chain joined to a difunctional reactant and end component or monofunctional reactant.

The above formulas illustrate polymeric polyhydric alcohols made with dihydric phenols and difunctional alcohol-contributing reactants. If either of the polyfunctional reactants have a greater functionality than 2, complex tridimensional polymers are formed. Thus, the trihydric phenol has 3 reactive phenolic groups which can react with the polyfunctional alcohol-contributing reactant to give more complex polymeric products.

In all cases in which the polymeric polyhydric alcohols are prepared from polyhydric phenols and epihalohydrin or polyhalihydrin, it is in general necessary to use monofunctoinal reactants to furnish end groups for the polymeric chain both for control of the polymerization and to avoid a product containing undesirable phenolic groups or halogen groups at the ends of the polymeric chains, which groups, if present, are undesirable. When, however, the polymeric polyhydric alcohols are made from polyhydric phenols and polyepoxides, the reaction may be readily controlled and stopped at any stage of the polymerization reaction, without the use of the monofunctional reactant; or monofunctional reactants such as ethylene oxide, etc. may be used. In this case, there are no by-products to be removed and no organic halogen compounds present to interfere with the desired properties of the product.

In the above formulas, the number of hydroxyl groups per molecule will depend upon the extent of the polymerization, the number of hydroxyl groups contributed by each of the polyfunctional alcohol-contributing reactants, and any hydroxyl groups or unreacted epoxy groups present in the end components or monofunctional reactants when used. Thus in Formula 2 above, if epichlorhydrin is used with a dihydric phenol, each epichlorhydrin residue will furnish 1 hydroxyl group and the total number of hydroxyl groups will be $n+1$. If a polyepoxy compound is used and furnishes 2 hydroxyl groups for each polyepoxy residue, and if no monofunctional reactant is used, the number of hydroxyl groups per molecule will be $2n$. If, in Formula 1 above, the monofunctoinal reactant furnishes 1 hydroxyl group and the polyepoxy compound used furnishes 2 hydroxyl groups, the number of hydroxyl groups will be $2n+2$. By proper regulation of the proportions of reagents used, the number of hydroxyl groups per molecule can be regulated and controlled and predetermined. In general, the polymeric polyhydric alcohols may contain e. g. from 3 to 20 hydroxyls per molecule; but much more valuable and advantageous products are produced with alcohols of e. g. 5 to 15 hydroxyls per molecule, when esterified with fatty acids which give more than 9 double bonds per molecule of ester formed.

The new drying compositions are prepared by esterification of the polymeric polyhydric alcohols of predetermined number of polymeric units and of hydroxyl groups per molecule with fatty acids which include unsaturated fatty acids, and with regulation and control of the nature of the unsaturated acids and of the number of double bonds per molecule of ester formed. The new drying compositions can be made by esterification with drying oil fatty acids of polymeric polyhydric alcohols containing e. g. 3 to 5 hydroxyl groups per molecule; but more valuable and advantageous products can be made rfom alcohols containing a larger number of hydroxyl groups e. g. 6 to 15 hydroxyl groups per molecule. So also, more valuable and advantageous products can be produced from semi-drying oil fatty acids or even from non-drying oil fatty acids, such as oleic acid, or from mixtures of drying oil acids with saturated acids, or mixtures of semi-drying oil acids with saturated acids, or mixtures of semi-drying oil or non-drying oil unsaturated acids with saturated acids, by esterification of polymeric polyhydric alcohols containing a larger number of hydroxyl groups, e. g. 5 to 15 hydroxyl groups per molecule, and with more than 9 double bonds per molecule in the fatty acid residues.

I have found that valuable drying esters can be prepared from semi-drying oil acids, or even from non-drying oil acids containing oleic and other unsaturated acids, by esterification of polymeric polyhydric alcohols containing a sufficient number of hydroxyl groups per molecule. I have also found that valuable drying compositions can be made by esterification with mixtures of drying oil acids and saturated acids, or with semi-drying or non-drying oil acids also present, of the polymeric polyhydric alcohol having a sufficient number of hydroxyl groups.

The new drying compositions made by esterification of polymeric polyhydric alcohols with a sufficient number of hydroxyl groups with semi-drying and non-drying oil fatty acids, or with mixtures of drying oil and unsaturated acids, etc. gives high molecular weight esters which have valuable drying properties even though they are made from semi-drying or non-drying oil acids, or even though they are made with a considerable proportion of saturated acids admixed with drying oil acids, etc.

The fatty acids used for esterification should include unsaturated fatty acids sufficient to give at least 6 double bonds per molecule; and much more valuable and advantageous products are obtained with fatty acids which give more than 9 double bonds per molecule. It is one of the advantages of the present invention that it enables large molecular weight esters to be produced with the use of mixtures of saturated and unsaturated acids for esterification or with the use of semi-drying oil or non-drying oil fatty acids, by using alcohols with e. g. 5 to 20 hydroxyl groups per molecule and by using fatty acids which will give at least 9 double bonds per molecule of ester formed. There are important practical advantages in the production and use of higher molecular weight esters with a larger number of hydroxyl groups and a larger number of double bonds, and with proper regulation and correlation of hydroxyl groups esterified and of the fatty acids used for esterification.

The new drying esters can in practice be readily prepared by esterifying the polymeric polyhydric alcohols with drying, semi-drying and non-drying oil acids by the application of heat, e. g., at a temperature of 200 to 300° C. Since the unsaturation present in the acid chains tends to heat polymerize during esterification, the esterification of alcohols having a large number of hydroxyl groups per molecule with highly unsaturated acids tends to form an insoluble mixture before satisfactory esterification is reached; and the upper limit in the number of hydroxyl groups present in the alcohol to be esterified by the application of heat will vary somewhat with different acids and acid mixtures. An excess of the polyhydric alcohol is advantageously used in esterification with fatty acids in order to obtain satisfactory esterification, e. g., an acid value below 10. Usually about 0.9 mol of acid is used to esterify 1 equivalent of alcohol. With this ratio of alcohol and acid the effective number of hydroxyl groups per molecule of alcohol is equal to the number of mols of acid required to esterify 1 mol of the alcohol and is less by 10% than the theoretical number of hydroxyl groups. The esters may therefore be described by reference to the "number of ester chains" per molecule.

The following table illustrates practical upper and lower limits for the number of ester chains present per molecule of esters having satisfactory drying properties and prepared by esterification by heating as above described.

TABLE I

*Number of ester chains per molecule of final ester*

| | Lower Limit | Upper Limit |
|---|---|---|
| Dehydrated Castor Oil Acids | 2.5 | 9 |
| Linseed Oil Acids | 3.0 | 10 |
| Soybean Oil Acids | 4.5 | 12 |
| Cottonseed Oil Acids | 5.5 | 13 |
| Oleic Acid (tech.) | 7.3 | 15 |

In this table the lower limit represents an ester composition which will give a 24-hour tack free dry (using the optimum amount of dryer) when applied in films of 0.001 to 0.002 inch thick; and the upper limit represents ester compositions which approach the point of gelation during the esterification.

It will be noted from the above table that there is a range in the number of ester chains between the lower and upper limits within which drying compositions are obtained. The properties of the drying compositions will vary somewhat within this range. For example, a linseed acid ester containing 8 ester chains per molecule has a higher viscosity than a linseed ester containing 6 ester groups per molecule when tested on a Gardner bubble Viscosimeter as a solution of 50% solids in mineral spirits. Variation in the number of ester chains thus enables products of somewhat different properties and adapted for somewhat different applications and uses to be produced.

The lower limit of the above table represents drying compositions containing approximately 6 double bonds per molecule. The lower portion of the range of the above table, representing a range of from 6 to 9 double bonds per molecule, gives satisfactory drying compositions; but much more valuable compositions are produced with a larger number of ester chains per molecule and a larger number of double bonds per molecule. There are important practical advantages, as above pointed out, in the higher molecular weight esters with the larger number of hydroxyl groups and a larger number of double bonds.

Thus, the linseed ester of an alcohol containing 3 hydroxyl groups will air dry in about 20 to 24 hours; but linseed esters of alcohols containing a larger number of hydroxyl groups will air dry in a radically shorter time, which adapts them to important practical applications where quick drying is desired. For example, a linseed ester of an alcohol containing 8 to 9 hydroxyl groups will air dry in about 1 hour.

Furthermore, with increasing molecular weight and increasing number of hydroxyls per molecule, the amount of unsaturation required in the acids decreases, so that mixtures of drying oil acids and saturated acids can be used, and so that semi-drying or non-drying oil acids can be used, and valuable drying compositions nevertheless obtained. The invention thus makes possible the production of valuable new drying compositions from cottonseed acids, oleic acid, and mixtures of stearic acid with unsaturated acids, by using alcohols of suitable predetermined molecular weights and hydroxyl contents. The invention this provides valuable commercial products from acids of lower unsaturation than drying oil acids, but nevertheless with drying properties which make them comparable with or superior to drying compositions made with linseed products. Polymeric polyhydric alcohols may be esterified with non-drying acids such as cottonseed oil acids to give compositions which possess drying characteristics comparable to the best China-wood oil varnishes.

Variations in the viscosities of the products and in the final hardness of the films made therefrom after air oxidation or heat treatment can be obtained by the use of different polymeric polyhydric alcohols. The structures of the polymeric polyhydric alcohol, aside from the number of esterifiable hydroxyl groups per molecule, influences the viscosities of the products and also the final hardness of the films made therefrom. Thus esters prepared from polymeric polyhydric alcohols of high equivalent weight give more viscous products and harder films than do esters prepared from alcohols of low equivalent weight, even though they contain the same number of ester chains per molecule. For example, an ester containing 8 ester chains per molecule made by esterifying an alcohol prepared by the reaction of bis-phenol with epichlorhydrin and glycerol monochlorhydrin is much more viscous and gives a much harder film than an ester containing 8 ester chains per molecule made by esterifying an alcohol prepared by the reaction of resorcinol with epichlorhydrin and glycerol monochlorhydrin.

While ordinary drying oils are limited to esters of drying oil acids, the new esters of polymeric polyhydric alcohols of the present invention can readily be produced with desirable drying properties from semi-drying oil acids and from non-drying oil acids, as well as from mixtures of saturated acids with drying, semi-drying or non-drying unsaturated acids. The following table gives illustrative examples of ester compositions prepared from various acid mixtures used to esterify polyhydric alcohols prepared from bis-phenol, epichlorhydrin and phenol, these esters having comparable drying properties.

Table II

| Acids | Av. No. of Double Bonds per Chain | Av. No. of Ester Groups per Mol of Final Ester | Rocker Hardness, Hours | | |
|---|---|---|---|---|---|
| | | | 8 | 24 | 72 |
| Cottonseed | 1.15 | 10.6 | 6 | 11 | 26 |
| Mixture of linseed and stearic | 1.35 | 9.5 | 5 | 13 | 27 |
| Soy | 1.37 | 9.5 | 5.5 | 12.5 | 30 |
| Mixture of linseed and stearic | 1.70 | 8.6 | 5 | 11 | 31 |
| Linseed | 2.04 | 7.6 | 6 | 13 | 29 |

It will be noted from this table that with an increased number of ester chains per molecule drying esters can be prepared from cottonseed or soy acids or from mixtures of linseed and stearic acids having drying properties comparable to esters obtained with a lesser number of ester chains per molecule of linseed acids. The increased number of ester chains per molecule and the increased molecular complexity resulting therefrom makes up for the lesser unsaturation of the ester chains taken as a whole.

The nature of the product can also be varied by varying the unsaturation of the acids, i. e., the average number of double bonds per ester chain, with the same polymeric polyhydric alcohol. The following table shows the effect of increasing the unsaturation of the acids used in esterifying a polymeric polyhydric alcohol containing 10.5 hydroxyl groups per molecule (esters containing 9.5 ester chains per molecule), the alcohol being prepared from bis-phenol, epichlorhydrin and phenol.

Table III

| Mols of Acid Used | | Rocker Hardness on 24 Hour Air Dry |
|---|---|---|
| Linseed | Stearic | |
| 2.7 | 6.8 | 4 |
| 3.6 | 5.9 | 6 |
| 4.5 | 5.0 | 9 |
| 6.3 | 3.2 | 14 |
| 8.1 | 1.4 | 20 |

Esters prepared from acids containing conjugated double bonds are more active drying compositions and are likewise more sensitive to heat polymerization during heat esterification than are those prepared from acids containing only isolated double bonds. A comparison of esters of linseed acids and of dehydrated caster oil acids (about 40% conjugated unsaturation) indicates that the conjugated unsaturation present in the dehydrated casteor oil acids is 2 to 2½ times as active as isolated double bonds.

The following table further illustrates variations in the esters when made of mixed linseed and stearic acids with progressively increasing proportions of stearic acid and of ester chains per molecule and correspondingly increased number of hydroxyl groups per molecule of the polymeric polyhydric alcohols prepared from bis-phenol, epichlorhydrin and phenol.

Table IV

| Mols of acid used per mol of alcohol | | No. of ester chains per molecule | Av. No. of double bonds per ester chain |
|---|---|---|---|
| Linseed | Stearic | | |
| 3 | 1.5 | 4.5 | 1.36 |
| 3 | 4.2 | 7.2 | 0.85 |
| 3 | 5.2 | 8.2 | 0.75 |
| 3 | 6.5 | 9.5 | 0.64 |
| 3 | 6.9 | 9.9 | 0.62 |
| 3 | 8.3 | 11.3 | 0.54 |
| 3 | 9 | 12 | 0.51 |

In the esters of the above table the average number of double bonds per ester chain decreases with the increase in the number of ester chains per molecule but drying compositions made of the esters of the above table gave tack-free dry within 24 hours' exposure of thin films to air, using optimum amounts of driers.

The following table further illustrates the variations obtainable with varying proportions of linseed and stearic acids and shows that low equivalent weight alcohols give softer films than do those of higher equivalent weight. The polymeric polyhydric alcohol from resorcinol and epichlorhydrin represents a lower equivalent weight than the alcohols from bis-phenol and epichlorhydrin.

Table V

| Alcohol prepared from— | Acids used in esterification | Av. No. of ester groups per molecule | Av. No. of double bonds per ester chain | 24 hour rocker harnness | Tack free time |
|---|---|---|---|---|---|
| Bis-phenol and epichlorhydrin | 98% Linseed / 2% Stearic | 6 | 2 | 8 | Hours 6 |
| Do | 78.5% Linseed / 21.5% Stearic | 7.5 | 1.6 | 9 | 6 |
| Do | 65% Linseed / 35% Stearic | 9 | 1.33 | 8 | 6¼ |
| Resorcinol and epichlorhydrin | 65% Linseed / 35% Stearic | 9 | 1.33 | 4 | 12 |

The new synthetic high molecular weight unsaturated esters of polymeric polyhydric alcohols are soluable in organic solvents including mineral spirits. Their solutions give excellent varnishes. Films prepared from these compositions after hardening by air oxidation or heat polymerization are hard and flexible. They possess an exceedingly high resistance to alkali and water. They are relatively non-yellowing in comparison with the usual phenol formaldehyde drying oil type of varnish. Varnishes made of the new complex esters of the present invention form fast drying films as distinguished from slow drying phenol formaldehyde type varnishes prepared from linseed or soya oil.

The nature and advantages and outstanding properties of the new complex ester compositions of the present invention are further illustrated by the following table of which Examples 1, 2 and 3 are alkyd resins used as a standard of comparison on rocker hardness and alkali resistance. In figuring the "per cent oil modification" of the following table the ester chain including the ester group is considered as oil modification.

tion as above described there is a practical upper limit to the number of hydroxyls in the polymeric polyhydric phenol which can be esterified without heat polymerization and jelling of the mixture before satisfactory esterification is reached, and the number of hydroxyl groups will vary with the nature of the unsaturated acids or the average degree of unsaturation of the acids employed. The number of hydroxyl groups in the polymeric polyhydric alcohol may thus vary from 3 to 20 depending upon the nature of the acids used for esterification. The esterification can also be carried out by other methods, e. g., indirectly by reaction of the alcohol in pyridine solution with fatty acid chlorides and with sufficiently mild conditions of reaction to prevent simultaneous polymerization. Alcohols of varying number of hydroxyl groups can be esterified. For practical purposes, the esterification by heating above described is an advantageous method and is particularly applicable to alcohols containing from 3 to 15 hydroxyl groups such as those made from bis-phenol with polyhaloalcohols, epihalohydrins and polyepoxy compounds.

TABLE VI

| | Equiv. wt. of alcohol used | No. of ester chains per molecule | Acids used to esterify polyhydric alcohol | 50% solids in hydrocarbon solvents possessing Kauri-Butanol solvency of | Acid Value on Solids | Viscosity of 50% solution by Gardner-Bubble Viscosimeter | Percent Oil Modification | Air Dry Films | | Rocker Hardness of 48 hr. air dry film | Films Baked 30 Min. at 300° F. | |
|---|---|---|---|---|---|---|---|---|---|---|---|---|
| | | | | | | | | Dry to Touch | Resistance of Film after 1 wk dry to 5% NaOH at 25° C. | | Resistance to 5% NaOH at 25° C. | Rocker Hardness |
| | | | | | | | | Hours | | | | |
| 1 | | | Dehydrated castor oil alkyd. | | | | 50 | | 1–5 min. | 13 | 4–5 hrs. | 9 |
| 2 | | | Linseed oil alkyd. | | | | 50 | | 1–5 min. | 19 | 2–4 hrs. | 13 |
| 3 | | | Soy bean oil alkyd. | | | | 50 | | 1–5 min. | 13 | 2–4 hrs. | 8 |
| 4 | 280 | 9 | Linseed. | 53 | 7.3 | R | 50 | 1 | 30 days. | 31 | 6 months+. | 20 |
| 5 | 281 | 11.5 | Soy. | 102 | 4.7 | P | 50 | 1 | 60 days. | 32 | 6 months+. | 17 |
| 6 | 278 | 7 | Dehydrated Castor. | 53 | 3.5 | T | 54 | | 25 days. | 23 | 6 months+. | 9 |
| 7 | 182.4 | 6.44 | do. | 53 | 4.5 | J | 60 | | 30 hrs. | 15 | 10 days. | 7 |
| 8 | 281.1 | 12.3 | 50% soy and 50% stearic. | 102 | 9.8 | X | 50 | | 25 days. | 9 | 6 months+. | 15 |
| 9 | 281.1 | 12.3 | Oleic. | 102 | 9.8 | V-W | 50 | | 25 days. | 7 | 6 months+. | 18 |

The following procedure is typical and illustrative of the method by which the new esters of the present invention as given in the preceding tables may be prepared:

To 1 equivalent of a polymeric polyhydric alcohol (e. g. that prepared from bis-phenol, epichlorhydrin and phenol) in an apparatus equipped with a mechanical stirrer is added 0.9 to 0.95 mol of an unsaturated acid mixture, composed of the chain acids derived from drying oils, from semi-drying oils, or from non-drying oils of the glyceride type, or mixtures of such acids. The apparatus is equipped with a condenser attached thereto through a watertrap, with a thermometer and with means for bubbling inert gas such as $CO_2$ through the reaction mixture during esterification. Heat is applied and after the polymeric polyhydric alcohol has melted, stirring is started and continued during esterification. A slow stream of an inert gas such as $CO_2$ is bubbled through the reaction mixture to aid in removing water formed during esterification. The reaction mixture is heated for e. g. 4 to 5 hours at e. g. 250–260° C., water of esterification being removed through the watertrap. The resulting product is cut to the desired solid content by adding hydrocarbon solvents and the resulting solutions form excellent compositions for making protective films adapted to harden on air oxidation or heat polymerization or both.

When the esters are prepared by heat esterifica-

The preparation of the polymeric polyhydric alcohols which are esterified to produce the new high molecular weight unsaturated esters of the present invention will be illustrated by the following description and examples.

The polymeric polyhydric alcohols are prepared by the reaction of the polyhydric phenols with polyhalo alcohols, epihalohydrins, or polyepoxy compounds used as polyfunctional compounds (functional in this case referring to reactivity with a phenol group or its salt). The degree of polymerization will depend on the amount of polyfunctional compound used. It is sometimes desirable and even necessary in some cases to hold back the degree of polymerization by using considerable quantities of monofunctional reactants such as phenol, ethylene chlorhydrin, glycerol chlorhydrin, etc. along with the polyfunctional reactants. The degree of polymerization and the number of hydroxyl groups per molecule are dependent upon the molar ratio of monofunctional and polyfunctional reactants. The complexity of the polymeric polyhydric alcohols depends upon the functionality and the hydroxyl content of the reactants used and the functionality and hydroxyl content of the reactants may be adjusted so as to obtain the desired complexity of the final product. With relatively low degree of polymerization (less than 20 polymeric units) such reactions proceed to within 95% of completion.

The nature and preparation of the polyhydric alcohols will be illustrated by the following examples:

*Example 1.*—Reaction of bis-phenol (p,p'-dihydroxydiphenyl dimethyl methane) with epichlorhydrin and ethylene chlorhydrin (as monofunctional reactant). The number of polymeric units ($n$) is dependent upon the quantities of bis-phenol and epichlorhydrin used and the number of hydroxyl groups per molecule is dependent upon the quantity of epichlorhydrin used. It is possible to synthesize products containing a predetermined number of polymeric units and a predetermined number of hydroxyl groups per molecule by using the proper quantities of reactants.

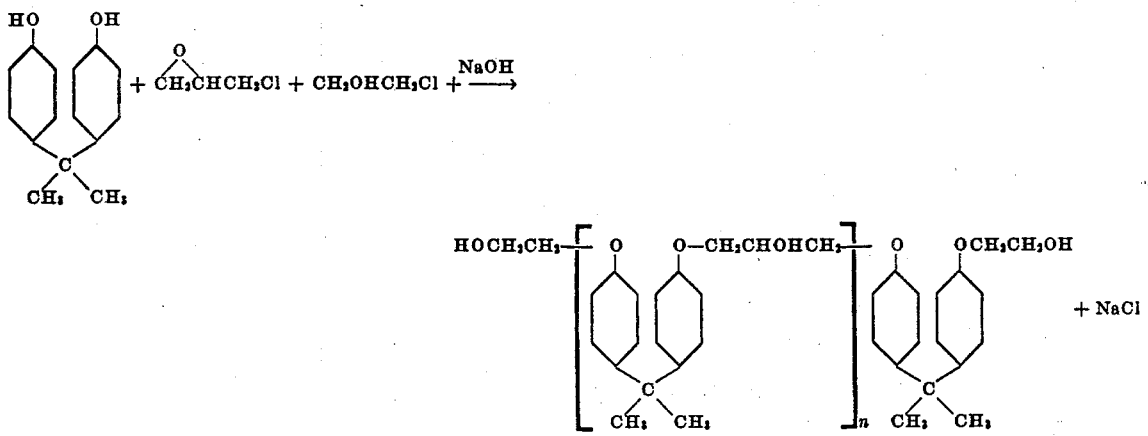

*Example 2.*—Reaction of bis-phenol with epichlorhydrin, using phenol as the monofunctional reactant.

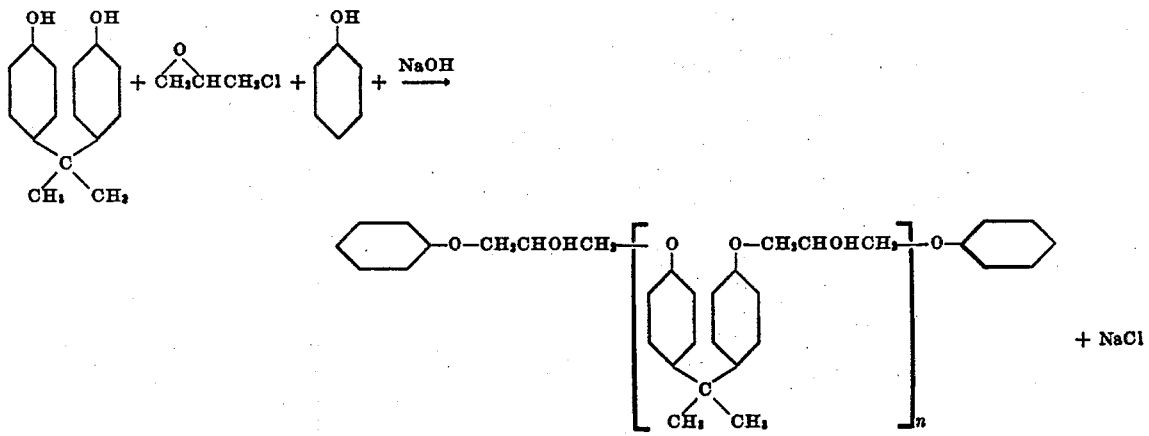

*Example 3.*—The potassium salt of hydroquinone is reacted with epichlorhydrin and with a monofunctional reactant as in Example 2.

*Example 4.*—The trisodium salt of phloroglucinol is reacted with an equivalent amount of equimolecular parts of glycerol monochlorhydrin and glycerol dichlorhydrin.

Other polyhydric phenols can be used in a similar way. The hydroxyl contributing reactant or reactants used in synthesizing the polymeric polyhydric alcohol may be entirely polyfunctional or may be in part polyfunctional and in part monofunctional (functional in this case referring to reactivity with a phenol group or its salt). The degree of polymerization will depend on the amount of polyfunctional compound used. The degree of polymerization can be controlled by using suitable quantities of monofunctional reactants along with the polyfunctional reactants; and, where the monofunctional reactants also contain hydroxyl groups, the total number of hydroxyl groups will be contributed in part by the polyfunctional reactant and in part by the monofunctional reactant.

The polyhydric alcohols used in preparing the new esters contain, e. g., from 3 to 20 hydroxyl groups per molecule, that is, a relatively small number of polymeric units. Such products of predetermined hydroxyl content and molecular weight are especially valuable as intermediates for esterification with unsaturated acids, as hereinbefore described, to give varnish compositions which possess excellent drying characteristics.

In preparing polymeric polyhydric alcohols with definite predetermined molecular weights and hydroxyl contents for use in preparing the new drying ester compositions, the polyfunctional reactants are generally used in quantities other than equivalent amounts. When polyhalohydrins or epichlorhydrins are used, the product should in general be relatively free from unreacted halogen groups and unreacted phenol groups and in that case monofunctional reactants are used in quantities equivalent to the excess of the polyhydric phenol over the polyhalohydrin or epihalohydrin.

From the foregoing description relating to the esterification of the polymeric polyhydric alcohols it is evident that the polymeric polyhydric alcohols should have definite predetermined molecular weights and hydroxyl contents; and that, in particular, the polymeric polyhydric alcohols should have a number of hydroxyl groups per molecule which is properly related to the unsaturated acids used for esterification in order to give satisfactory drying compositions. Thus an alcohol which gives drying compositions when esterified with linseed acids may have an insufficient number of hydroxyl groups to give an oleic acid ester with drying characteristics; while a polymeric polyhydric alcohol with a larger number of hydroxyl groups may give an excellent drying composition when esterified with oleic acid. Thus the esterification with an equivalent amount of oleic acid of a polymeric polyhydric alcohol containing 12 hydroxyl groups per molecule gives an excellent drying composition; whereas complete esterification of this same alcohol with linseed acids tends to cause jelling before esterification is completed. A polymeric polyhydric alcohol containing 6 hydroxyl groups when completely esterified with linseed acids gives an excellent drying composition while a polymeric polyhydric alcohol containing 8 hydroxyl groups per molecule when completely esterified with linseed acids gives an excellent drying composition possessing a much higher viscosity. These two linseed esters would have different properties and would be adapted for somewhat different purposes. It is accordingly important in synthesizing the polymeric polyhydric alcohols to insure a predetermined functionality (number of hydroxyl groups per molecule) such that it can be esterified with a particular kind of unsaturated fatty acids to give drying compositions. A difference of 1 hydroxyl group per molecule of the alcohol gives an appreciable difference in the properties of the esters prepared with the same acids.

The method of predetermining the molecular weights and number of hydroxyl groups per molecule of the polymeric polyhydric alcohol may be illustrated with reference to Example 1 above using bis-phenol and epichlorhydrin, both difunctional reactants, and ethylene chlorhydrin as monofunctional reactant. If $n$ is the number of polymeric units then it is evident that there are $n$ molecules of epichlorhydrin reacting with $n+1$ molecules of bis-phenol and that 2 molecules of ethylene chlorhydrin react with the bis-phenol. Each molecule of epichlorhydrin furnishes one hydroxyl group and each molecule of ethylene chlorhydrin also furnishes one hydroxyl group so that the number of hydroxyl groups is $n+2$. In order to produce the polymeric polyhydric alcohol with e. g. 8 hydroxyl groups, since $n+2=8$, it is evident that 7 mols of bis-phenol are reacted with 6 mols of epichlorhydrin and 2 mols of ethylene chlorhydrin.

Where the polyhalohydrin or epihalohydrin furnishes one hydroxyl group it is evident that the total number of hydroxyl groups in the polymeric polyhydric alcohol is $n$ plus twice the number of hydroxyl groups contributed by each molecule of monofunctional reactant.

The following example will further illustrate the preparation of the polymeric polyhydric alcohols and the procedure to be followed:

Into a weighted 300 gallon stainless steel kettle, equipped with an agitator, weigh 606 pounds of bis-phenol, 119 pounds of caustic soda and 1300 pounds of water. Heat with stirring until all of the bis-phenol has dissolved. Add 60 pounds of phenol and allow to cool, if necessary, to about 40° C. Add 274.8 pounds of epichlorhydrin and stir, allowing the reaction mixture to heat gradually to 60–65° C. over a period of 45 minutes. (The exothermic reaction usually furnishes sufficient heat at this stage without the application of external heat.) Add 29.5 pounds of caustic soda dissolved in 90 pounds of water. Heat gradually to 90–100° C. and hold at this temperature for about 1 hour. The separated upper layer of salt water is removed, hot water added and the stirring continued with heating at 100° C. for about fifteen minutes. The salt water layer is removed and the washing repeated three times, adding sufficient quantity of acetic acid or hydrochloric acid to the second washing and more to the third washing if necessary to neutralize all of the excess caustic soda. The washing should be continued until the water is neutral to litmus. Heat is applied with continued stirring until all of the water included in the reaction product is removed. The product had a softening point of 118° C.

The following table describes some of the polymeric polyhydric alcohols prepared from bis-phenol and epichlorhydrin using various monofunctional reactants to control the molecular weight and number of hydroxyl groups of the product. In the table "mol %" is used to designate the amount of one difunctional reactant used when the other is held constant at 100%. The "mol %" is arbitrarily taken as 100 when the difunctional reactants are used in equimolar proportions. For each mol deficiency (below 100%) of a difunctional reactant, 2 mols of a monofunctional reactant is used to furnish end groups for the polymeric chain.

| | Mol percent difunctional reactant used in deficiency | Monofunctional reactant used to furnish end groups | Average value of polymeric units ($n$) | Average No. of hydroxyl groups per molecule | Equivalent weight to esterification | Average molecular weight | Softening point by Durran's Mercury method |
|---|---|---|---|---|---|---|---|
| | | | | | | | °C. |
| 1 | 77.5 Epichlorhydrin | Glycerol monochlorhydrin | 3.44 | 7.44 | 182.4 | 1,356 | 116.5 |
| 2 | 87.5 Epichlorhydrin | do | 7 | 11 | 215 | 2,365 | 129 |
| 3 | 80 Epichlorhydrin | Ethylene chlorhydrin | 4 | 6 | 242 | 1,458 | 106.5 |
| 4 | 83 Epichlorhydrin | do | 4.9 | 6.9 | 247.5 | 1,705 | 116 |
| 5 | 85 Epichlorhydrin | do | 5.67 | 7.67 | 252.4 | 1,938 | 119 |
| 6 | 90 Epichlorhydrin | do | 9 | 11 | 261 | 2,871 | 129 |
| 7 | 90 Epichlorhydrin | Dimethyl sulfate | 9 | 9 | 312 | 2,808 | 116.5 |
| 8 | 92.5 Epichlorhydrin | do | 12.3 | 12.3 | 304 | 3,742 | 126 |
| 9 | 85 Bis-phenol | Phenol | 5.67 | 6.67 | 278 | 1,856 | 110 |
| 10 | 87.5 Bis-phenol | do | 7 | 8 | 278 | 2,224 | 114 |
| 11 | 89 Bis-phenol | do | 8.1 | 9.1 | 279 | 2,539 | 118 |
| 12 | 90 Bis-phenol | do | 9 | 10 | 280 | 2,800 | 124 |
| 13 | 92 Bis-phenol | do | 11.5 | 12.5 | 281 | 3,555 | 137.5 |
| 14 | 92.5 Bis-phenol | do | 12.3 | 13.3 | 231.1 | 3,733 | 154 |

The method described and illustrated for the control of the complexity of polymeric polyhydric alcohols derived from bis-phenol and epichlorhydrin may be applied to other combinations of reactants. The complexity of the polymeric polyhydric alcohols depends on the degree of functionality and the hydroxyl content of the reactants used and the functionality of such reactants may be adjusted so as to obtain the desired complexity of the final product.

For the preparation of higher melting products, closed kettles can be used and the process carried out at higher temperatures and under pressure to keep the product softened so that the reaction may proceed to completion and so that the salt may be removed by washing after the reaction is complete.

Polymeric polyhydric alcohols can also be advantageously prepared from polyhydric phenols and polyepoxy compounds and the use of polyepoxy compounds is particularly advantageous. The method of preparing the polymeric polyhydric alcohols from the polyhydric phenols and polyepoxy compounds is illustrated by the following typical reactions:

1. Reaction of bis-(2,3-epoxypropyl) ether with bis-phenol (p,p'-dihydroxydiphenyl dimethyl methane).

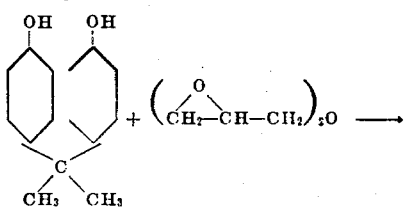

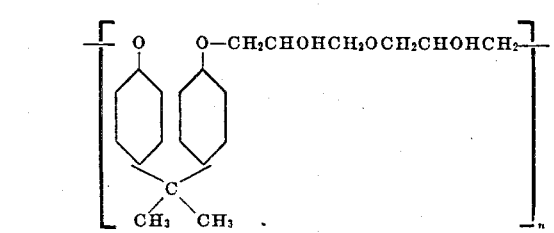

2. Reaction of butylene dioxide with phloroglucinol.

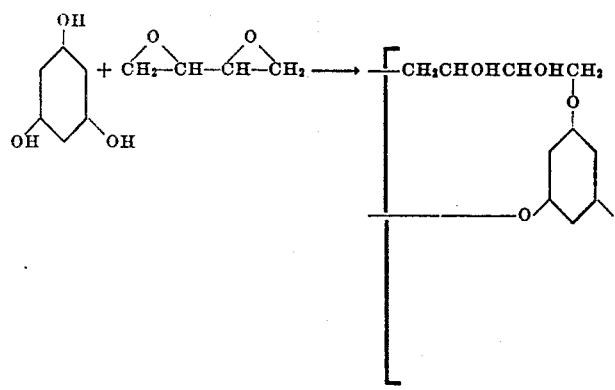

In these reactions the polymer will be linear when both of the reactants are difunctional (reaction 1) but if either or both of the reactants have a greater functionality than 2 (reaction 2) cross linking may take place and complex tri-dimensional polymers formed.

The structure of these polymeric polyhydric alcohols is such that the coupling portion contributed by the epoxy compound and the coupling portion contributed by the polyhydric phenol occur as alternating units in the polymeric chain.

The polymeric polyhydric alcohols can be readily prepared in this way by heating the reactants together for a short time, e. g., at temperatures of 50–250° C., the temperature and the time for any given reaction depending on the activity of the reactants. Where all of the reactants have boiling points above the reaction temperature the reaction may be carried out in an ordinary open vessel. Where low boiling reactants such as ethylene oxide are used, the reaction is advantageously carried out under pressure; while in cases where one or more of the reactants used boils at approximately the same temperature as the reaction temperature, the reaction is advantageously carried out in apparatus equipped with a reflux condenser.

Another advantageous feature of this method is the ease with which the polymerization may be stopped or started at any stage of the reaction. This is especially advantageous in preparing esters from the alcohols since heating may be continued after the addition of the acids without any further polymerization due to the fact that any unreacted epoxy groups present will be split by the predominantly larger amount of carboxyl groups present.

The use of polyepoxy compounds for reacting with the polyhydric phenols has the further advantage that the production of by-products, such as salt, is avoided and the process may be carried out without the use of a catalyst or with such small amounts of acidic or basic catalysts that they may be permitted to remain in the product. Approximately quantitative yields are also obtainable.

The degree of polymerization can be controlled by using quantities other than equivalent amounts of the reactants and it may be desirable to use a quantity of monofunctional reactant in an amount equivalent to the excess. Thus bis-phenol may be made to react with a mixture of butylene dioxide and ethylene oxide; or butylene dioxide may be made to react with a mixture of bis-phenol and phenol.

The average molecular weights and average number of hydroxyl groups per molecule of the polymeric polyhydric alcohol produced may be calculated from the quantities of reactants used.

The degree of polymerization and the number of hydroxyl groups of the polymeric polyhydric alcohol can be controlled in a manner similar to that previously described. Thus if $X$ mols of one difunctional reactant is used and $Y$ mols of the other difunctional reactant, the number of mols of monofunctional reactant will be twice the difference between $X$ and $Y$. For example, with 3 mols of butylene dioxide, 4 mols of hydroquinone and 2 mols of ethylene oxide, there will be 2 hydroxyl groups furnished by each mol of butylene dioxide and 1 hydroxyl group by each mol of ethylene oxide and the total number of hydroxyl groups will be 8.

A wide variation in types of product may be obtained by variation in the reactants used depending upon the polyhydric phenol, the polyepoxy compound and the monofunctional reactant when used for holding back the degree of polymerization, particularly monoepoxy compounds such as ethylene oxide, propylene oxide, and glycidol. The use of monoepoxy compounds for regulating the degree of polymerization is particularly advantageous because they are completely taken up in the polymerization reaction. They are used in reactions in which the polyhydric phenol is used in greater than equivalent proportions with reference to the polyepoxy compounds. When the polyhydric phenol is used in less than equivalent proportions, a monohydric phenol is advantageously used as the monofunctional reactant. It is possible to use such monofunctional reactants as monochlorhydrins for regulating the degree of polymerization of the polyepoxides with polyhydric phenols, when the polyhydric phenols are used in greater than equivalent proportions with reference to the polyepoxides; but the use of such chlorine-containing compounds is undesirable, because of the by-products produced; while the use of monoepoxy compounds gives no undesirable by-products and these are completely taken up in the polymerization reaction. They have the further advantage that they contribute additional hydroxyl groups on the end components.

The preparation of the polymeric polyhydric alcohols by the use of polyepoxy compounds with polyhydric phenols, is further described in companion application Serial No. 535,342, filed May 12, 1944.

The polymeric polyhydric alcohols made with polyepoxy compounds have the advantage that they can be directly used for esterification with the unsaturated fatty acids to produce the new drying esters without the necessity of washing to remove salt and by adding the acid directly to the hot reaction product thereby stopping the further polymerization and combining the esterification as a part of the same process.

The preparation of such polyhydric alcohols is illustrated in the following table:

viscosity of a solution containing 50% solids in mineral spirits of kauri butanol solvency of 53 was H (bubble viscosimeter).

It is sometimes desirable and advantageous to use polyhalides which contribute no hydroxy group to the resulting compound in addition to polyhaloalcohols or epichlorhydrins to give polymeric polyhydric alcohols with a larger molecular weight for the same number of hydroxyl groups. Such high equivalent weight alcohols are of value in preparing esters of low oil modification. This is illustrated by the following example:

The polymeric polyhydric alcohol is prepared according to the procedure hereinbefore given using the following reagents in the following proportions: 0.8 mol bis-phenol, 0.4 mol phenol, 0.5 mol epichlorhydrin, 0.5 mol 1.4-dichlorobutene-2, and 1.75 mols sodium hydroxide.

The resulting product has an equivalent weight of about 548 and a softening point of 93. In making this product, the dihalide which contributes no hydroxyl group to the resulting compound is the 1,4-dichlorobutene-2.

The polyhydric alcohol so produced was esterified with linseed acids in the proportion of 100 parts by weight of the alcohol and 46 parts of linseed acids, with the use of sufficient aromatic solvent to obtain constant refluxing during esterification. The reaction mixture was heated with continued stirring for about 4½ hours at 250–255° C. The acid value of the product based on the solids was 7.2. The viscosity of a solution of the product of 50% solids in aromatic solvent (of kauri butanol solvency of 75) was U. Films of this product, when baked or exposed to air, give very hard films which possess good flexibility.

In general, in producing the new esters by esterification with unsaturated acids of the polymeric polyhydric alcohols the esterification is advantageously carried to substantial completion,

| | Reactants | Reaction Temp. in °C. | Reaction Time | Catalyst | Softening Point in °C. of Product (Durran's Mercury Method) |
|---|---|---|---|---|---|
| | | | Minutes | | |
| 1 | 1 mol resorcinol<br>1 mol bis-(2,3-epoxypropyl) ether | 175 | 60 | none | 84 |
| 2 | 1 mol bis-phenol<br>1 mol butylene dioxide | 145 | 30 | do | 146 |
| 3 | 1 mol bis-phenol<br>1 mol bis-(2,3-epoxypropyl) ether | 200 | 30 | do | 113 |
| 4 | 1 mol bis-phenol<br>1 mol bis-(2,3-epoxypropyl) ether | 175 | 60 | 0.05 mol NaOH | 130 |
| 5 | 1 mol bis-phenol<br>1 mol butylene dioxide | 200 | 60 | none | 200 |
| 6 | 1 mol bis-phenol<br>0.9 mol bis-(epoxypropyl) ether<br>0.2 mol glycidol | 200 | 60 | 0.05 mol. NaOH | 91 |
| 7 | 0.9 mol bis-phenol<br>1 mol bis-(epoxypropyl) ether<br>0.2 mol phenol | 200 | 60 | do | 80 |

The following is an illustrative example of drying esters of polyhydric alcohols such as those of the above table:

In an apparatus provided with a stirrer 114 parts by weight of bis-phenol and 65 parts by weight of bis-(epoxypropyl) ether were heated with stirring at 180–190° C. for about three-quarters of an hour. To this product was added 209 parts by weight of linseed acid and sufficient mineral spirits to obtain constant refluxing during esterification. Esterification was effected by heating at 250–260° C. for five hours. The acid value of the solid product produced was 7.6. The or to as nearly complete an esterification as can be practically accomplished.

The new esters are quite generally compatible with drying oils but they can readily be prepared as "balanced" products of proper oil length to give the desired properties without the addition of resins on the one hand or of oils or plasticizers on the other, although the addition of such resins or oils is not precluded and may in some cases be used to give composite products.

The new esters are readily soluble in hydrocarbon solvents. Solutions of the drying esters are advantageously used as varnishes such as spray varnishes, brushing varnishes, etc. The balanced nature of the esters enables them to be used simply by dissolving the esters in appropriate solvents; or pigmented products may be produced by incorporating pigments with the ester and solvent. In making pigmented products the vehicle portion of the finished product may advantageously be made up entirely of the new esters dissolved in the solvent. Blends of the drying esters with other resins such as alkyds or resin gums or oleo resinous varnishes, etc., may be made.

The new coating compositions made with the new drying esters may be used for many purposes where varnishes, varnish enamels and pigmented products are desired such as floor and deck enamels, enamels for coating metals, cement, plastered walls where alkali is present, water tanks, or other surfaces which may be exposed to alkali, moisture and acids.

The new coating compositions are, as previously pointed out, converted into insoluble and infusible surface coatings by air oxidation or heat polymerization after the removal of the volatile solvent.

It will further be seen that the present invention makes it possible to produce balanced products of proper oil lengths to give the desired properties and quick drying compositions with varying combinations of unsaturated fatty acids by proper selection and control of the polymeric polyhydric alcohol and the selection of the unsaturated fatty acids or fatty acid mixture used for esterification.

In ordinary oleo resinous varnish formulations only drying oils such as linseed, tung, and dehydrated castor oils or equivalent oils are generally available because oils with other fatty acid combinations do not give proper drying products.

The new drying esters can be made of drying oil acids, although tung oil fatty acids, because of their high reactivity and the attendant difficulty of avoiding gelation, are not advantageous in making the new esters. Other drying oil acids, however, such as linseed and dehydrated castor oil can advantageously be used with proper regulation of the polymeric polyhydric alcohol, and particularly with a properly limited number of hydroxyl groups to be esterified by such acid.

But in addition to the use of such drying oil acids the present invention makes possible the use of a wide range of combination of unsaturated fatty acids, as well as of unsaturated and saturated fatty acids, and enables quick drying compositions to be nevertheless readily produced. In particular, the common semi-drying and even non-drying oil acids such as those of soya bean, cottonseed and even commercial red oil are advantageously used by properly correlating the average degree of unsaturation with a sufficiently large number of hydroxyl groups of the polymeric polyhydric alcohol esterified therewith.

It will be evident from the foregoing description that a limited range of polymerization of the polymeric polyhydric alcohols is characteristic of the alcohols used for esterification. The degree of polymerization as indicated by $(n)$ of the foregoing formula will in general not be more than 20 or 30 and will usually be a minimum of about 5.

It will also be seen that the degree of polymerization is correlated with the unsaturation of the fatty acids used for esterification. In general, the product obtained by multiplying the number of ester chains in the ester by the average number of double bonds in the fatty acids used is at least around 9 in most cases, although it may be somewhat smaller in some cases.

While the invention has been described in connection with esters made by esterifying the polymeric polyhydric alcohols with ordinary fatty acids, such as those readily available, these acids may be used in conjunction with other esterifying acids which do not materially affect the desirable properties of the product. Thus tall oil acids which are mixtures of fatty and resin acids can be used in regulated amount where the presence of the resin acids does not affect the desirable properties of the product, or where a product having the modified properties due to the resin acids is desirable.

I claim:

1. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, said alcohols containing from 3 to 20 hydroxyl groups per molecule, esterified with higher fatty acids, said esters containing from 6 to 20 double bonds per molecule in the fatty acid radicals, said esters being soluble in hydrocarbon solvents to form varnish compositions and with added pigments to form pigmented varnish compositions.

2. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, said alcohols containing from 5 to 20 hydroxyl groups per molecule, esterified with higher fatty acids, said esters containing from 6 to 20 double bonds per molecule in the fatty acid radicals, said esters being soluble in hydrocarbon solvents to form varnish compositions and with added pigments to form pigmented varnish compositions.

3. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, said alcohols being esterified with higher fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

4. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, said alcohols containing from 5 to 20 hydroxyl groups per molecule, esterified with unsaturated fatty acids, said esters containing from 6 to 20 double bonds per molecule in the fatty acid radicals, said esters being soluble in hydrocarbon solvents to form varnish compositions and with added pigments to form pigmented varnish compositions.

5. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, said alcohols containing from 6 to 15 hydroxyl groups per molecule, esterified with higher fatty acids having an average number of double bonds per ester radical of less than 1.5 and the product of the number of ester chains per molecule in the esters multiplied by the average number of double bonds in the ester chains being at least 9, said esters being soluble in hydrocarbon solvents to form varnish compositions and with added pigments to form pigmented varnish compositions.

6. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, including terminal hydroxyl-free aromatic nuclei, said alcohols containing from 5 to 20 hydroxyl groups per molecule, esterified with higher fatty acids, said esters containing from 9 to 20 double bonds per molecule in the fatty acid radicals, said esters being soluble in hydrocarbon solvents to form varnish compositions and with added pigments to form pigmented varnish compositions.

7. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, including terminal aliphatic groups, said alcohols being esterified with higher fatty acids and having ester groups united to both intermediate and terminal aliphatic chains, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

8. Drying compounds capable of hardening by air oxidation and by heat treatment to form insoluble and infusible protective coatings, said compounds being synthetic esters of polymeric polyhydric alcohols having alternating aliphatic chains and aromatic nuclei united through ether oxygen, the intermediate aliphatic chains containing a plurality of hydroxyl groups, said alcohols being esterified with higher fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

9. Drying compounds capable of hardening by air oxidation and by heat treatment to form insoluble and infusible protective coatings, said compounds being synthetic esters of polymeric polyhydric alcohols having alternating aliphatic chains and diphenyl dimethyl methane nuclei united through ether oxygen, said alcohols being esterfied with higher fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

10. Drying compounds capable of hardening by air oxidation and by heat treatment to form insoluble and infusible protective coatings, said compounds being synthetic esters of polymeric polyhydric alcohols having alternating aliphatic chains and diphenyl dimethyl methane nuclei united through ether oxygen and having hydroxyl-free terminal aromatic nuclei, said alcohols containing from 6 to 15 hydroxyl groups and being esterified with higher fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

11. Drying compounds capable of hardening by air oxidation and by heat treatment to form insoluble and infusible protective coatings, said compounds being synthetic esters of polymeric polyhydric alcohols having alternating aliphatic chains and diphenyl dimethyl methane nuclei united through ether oxygen, including terminal aliphatic groups, said alcohols being esterified with higher fatty acids attached to both the intermediate and terminal aliphatic chains, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

12. Drying compounds capable of hardening by air oxidation and by heat treatment to form insoluble and infusible protective coatings, said compounds being synthetic esters of polymeric polyhydric alcohols having alternating aliphatic chains and diphenyl dimethyl methane nuclei united through ether oxygen, including intermediate aliphatic chains containing a plurality of hydroxyl groups, said alcohols being esterified with higher fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

13. Drying compounds capable of hardening by air oxidation and by heat treatment to form insoluble and infusible protective coatings, said compounds being synthetic esters of polymeric polyhydric alcohols having alternating aliphatic chains containing 3 carbon atoms and diphenyl dimethyl methane nuclei united through ether oxygen, said intermediate aliphatic chains containing 1 hydroxyl group, said alcohols being esterified with highr fatty acids, the product of the number of ester chains per molecule of said esters multiplied by the average number of double bonds per ester chain being from 9 to 20, said esters being soluble in hydrocarbon solvents to form varnish compositions and with added pigments to form pigmented varnish compositions.

14. Drying compounds such as defined in claim 9 in which the fatty acids used for esterification include linseed oil acids.

15. Drying compounds such as defined in claim 9 in which the fatty acids used for esterification include dehydrated castor oil acids.

16. Drying compounds such as defined in claim 9 in which the fatty acids used for esterification include soya bean oil acids.

SYLVAN OWEN GREENLEE.

REFERENCES CITED

The following references are of record in the file of this patent:

UNITED STATES PATENTS

| Number | Name | Date |
|---|---|---|
| 2,022,766 | Harris | Dec. 3, 1935 |
| 2,023,388 | Harris | Dec. 3, 1935 |
| 2,071,459 | Furness | Feb. 23, 1937 |
| 2,197,813 | Strauss | Apr. 23, 1940 |
| 2,265,141 | Bruson | Dec. 9, 1941 |
| 2,269,529 | Goldsmith | Jan. 13, 1942 |
| 2,273,622 | Bruson | Feb. 17, 1942 |
| 2,275,494 | Bennett | Mar. 10, 1942 |
| 2,282,557 | Bruson | May 12, 1942 |
| 2,284,156 | Lemmer et al. | May 26, 1942 |
| 2,287,949 | Smith et al. | June 30, 1942 |
| 2,340,043 | Clare | Jan. 25, 1944 |
| 2,353,684 | Miescher et al. | July 18, 1944 |